United States Patent
Tanaka et al.

(10) Patent No.: US 9,832,330 B2
(45) Date of Patent: **\*Nov. 28, 2017**

(54) IMAGE READING APPARATUS

(71) Applicant: Brother Kogyo Kabushiki Kaisha, Nagoya-shi, Aichi-ken (JP)

(72) Inventors: Hiromi Tanaka, Nagoya (JP); Takashi Ohama, Iwakura (JP); Daisuke Kozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,748

(22) Filed: Oct. 27, 2016

(65) Prior Publication Data

US 2017/0048407 A1 Feb. 16, 2017

Related U.S. Application Data

(63) Continuation of application No. 14/844,056, filed on Sep. 3, 2015, now Pat. No. 9,516,184.

(30) Foreign Application Priority Data

Sep. 3, 2014 (JP) .................. 2014-178809

(51) Int. Cl.
*H04N 1/04* (2006.01)
*H04N 1/00* (2006.01)
(Continued)

(52) U.S. Cl.
CPC ........... *H04N 1/00525* (2013.01); *B65H 1/04* (2013.01); *B65H 1/266* (2013.01);
(Continued)

(58) Field of Classification Search
CPC ........ H04N 1/04; H04N 1/053; H04N 1/1135; H04N 1/00602; H04N 1/00708; H04N 2201/0081; H04N 2201/0094; G06K 9/52
(Continued)

(56) References Cited

U.S. PATENT DOCUMENTS

| 6,879,414 B2 * | 4/2005 | Ando | H04N 1/02815 |
| | | | 349/64 |
| 7,145,691 B2 * | 12/2006 | Kato | G03B 1/00 |
| | | | 358/1.9 |

(Continued)

FOREIGN PATENT DOCUMENTS

| JP | 4930580 B2 | 5/2012 |
| JP | 5075847 B2 | 11/2012 |

OTHER PUBLICATIONS

HP LaserJet Pro M225 Dw Wireless Monochrome Printer with Scanner, Copier and Fax (FW485A#BGJ), downloaded from <http://www.amazon.com/HP-LaserJet-Monochrome-CF485A-BGJ/dp/. . . >. Product made first available on Amazon.com on Sep. 1, 2014.

(Continued)

*Primary Examiner* — Negussie Worku
(74) *Attorney, Agent, or Firm* — Banner & Witcoff, Ltd.

(57) ABSTRACT

An image reading apparatus includes a main unit having a document support surface configured to support a document on the document support surface, a reading unit accommodated in the main unit and configured to read an image of the document supported on the document support surface, and an openable unit coupled to the main unit and configured to pivot about a pivot axis between a closed position where the document support surface of the main unit is covered and a released position where the document support surface of the main unit is exposed. The pivot axis of the openable unit is
(Continued)

located, in the main unit, below the document support surface and at a rear of the document support surface.

15 Claims, 10 Drawing Sheets

(51) Int. Cl.
    *B65H 1/04*     (2006.01)
    *B65H 1/26*     (2006.01)
    *H04N 1/10*     (2006.01)

(52) U.S. Cl.
    CPC ..... *H04N 1/00554* (2013.01); *H04N 1/00559* (2013.01); *H04N 1/00795* (2013.01); *H04N 1/10* (2013.01); *H04N 2201/0081* (2013.01); *H04N 2201/0422* (2013.01)

(58) Field of Classification Search
    USPC ............... 358/1.5, 474, 497, 498, 5; 399/51
    See application file for complete search history.

(56) References Cited

U.S. PATENT DOCUMENTS

| | | | |
|---|---|---|---|
| 8,154,768 B2 | 4/2012 | Muraki | |
| 8,154,770 B2* | 4/2012 | Shiraki | H04N 1/00522 271/117 |
| 8,526,080 B2 | 9/2013 | Kozaki | |
| 8,537,433 B2 | 9/2013 | Westcott et al. | |
| 8,619,273 B2 | 12/2013 | Mukai | |
| 8,862,770 B1 | 10/2014 | Smith et al. | |
| 8,886,088 B2 | 11/2014 | Okabe et al. | |
| 9,204,001 B2 | 12/2015 | Shiomi | |
| 9,628,142 B2* | 4/2017 | Tanaka | H04B 3/32 |
| 2011/0157662 A1 | 6/2011 | Kozaki | |
| 2012/0243021 A1* | 9/2012 | Osawa | H04N 1/00543 358/1.13 |
| 2013/0040219 A1* | 2/2013 | Naganuma | H01M 8/04014 429/429 |
| 2013/0083375 A1 | 4/2013 | Osakabe et al. | |
| 2014/0002870 A1 | 1/2014 | Kozaki | |
| 2014/0009801 A1 | 1/2014 | Osakabe et al. | |
| 2014/0118802 A1* | 5/2014 | Kozaki | H04N 1/10 358/497 |
| 2014/0138901 A1 | 5/2014 | Takahata et al. | |
| 2014/0184686 A1* | 7/2014 | Writt | G01N 21/57 347/19 |
| 2014/0226191 A1* | 8/2014 | Enomoto | H04N 1/00588 358/496 |
| 2015/0015920 A1 | 1/2015 | Muraoka | |
| 2015/0029563 A1* | 1/2015 | Tao | H04N 1/00771 358/498 |
| 2015/0085329 A1* | 3/2015 | Shibata | H04N 1/32646 358/474 |
| 2015/0242715 A1* | 8/2015 | Akimatsu | H04N 1/00615 358/1.12 |
| 2015/0326743 A1* | 11/2015 | Yabuuchi | H04N 1/00708 358/498 |
| 2016/0006899 A1* | 1/2016 | Kang | H04N 1/00551 358/474 |
| 2016/0150101 A1* | 5/2016 | Kikuta | H04N 1/0083 358/1.15 |

OTHER PUBLICATIONS

HP LES Fall Launch 2014, HP Press Kit, Sep. 4, 2014.
HP LaserJet Pro MFP M225dw, HP Datasheet, Jun. 2014.
Photos of HP LaserJet Pro M225dw; date of manufacture Jul. 22, 2014.

\* cited by examiner

IMAGE READING APPARATUS

CROSS REFERENCE TO RELATED APPLICATION

This application is a continuation of U.S. patent application Ser. No. 14/844,056 filed Sep. 3, 2015, which claims priority from Japanese Patent Application No. 2014-178809, filed on Sep. 3, 2014, which are incorporated herein by reference in their entirety.

TECHNICAL FIELD

Aspects of the disclosure relate to an image reading apparatus.

BACKGROUND

A known image reading apparatus includes a main unit, a reading unit, and an openable unit. The main unit has a document support surface to support a document on the document support surface, and a frame member having a rectangle shape and holding edges of the document support surface. The document support surface is shaped like a rectangle having a front edge and a rear edge extending in a left-right direction of the main unit, and a right edge and a left edge extending orthogonally to the front edge and the rear edge. The frame member includes an upper surface, a rear surface, and a bottom surface. The upper surface is located adjacent to and in parallel with the document support surface and extends in a front-rear direction. The rear surface is continuous with the upper surface and extends downward substantially vertically in a height direction relative to the document support surface. The bottom surface is continuous with the rear surface and faces the upper surface and the document support surface at a specified distance. The reading unit is accommodated in the main unit and configured to read an image of a document supported on the document support surface.

The openable unit is coupled to the main unit such that it is pivotable about an axis, which is horizontal relative to the main unit. The openable unit is disposed on top of the main unit. The pivot axis extends in parallel with the rear edge of the document support surface or in the left-right direction of the main unit. The pivot axis is located above the upper surface of the frame member in the height direction and disposed between the rear surface of the frame member and the rear edge of the document support surface in the front-rear direction. The openable unit is configured to pivot about the pivot axis to move between a closed position where the document support surface is covered and a released position where the document support surface is exposed.

SUMMARY

In the above image reading apparatus, however, the need to reduce the physical size is required. In this respect, as the above image reading apparatus has the pivot axis of the openable unit, which is located above the upper surface of the frame member in the height direction, the need to increase the size in the height direction from the upper surface of the frame member to the pivot axis located above the upper surface is inevitable, and thus it is difficult to make the image reading apparatus smaller in the height direction.

Illustrative aspects of the disclosure provide an image reading apparatus in which the need to increase the physical size of the image reading apparatus is obviated.

According to an aspect of the disclosure, an image reading apparatus includes a main unit having a document support surface configured to support a document on the document support surface and including a frame member holding edges of the document support surface, a reading unit accommodated in the main unit and configured to read an image of the document supported on the document support surface, and an openable unit coupled to the main unit and configured to pivot about a pivot axis between a closed position where the document support surface of the main unit is covered and a released position where the document support surface of the main unit is exposed. The frame member of the main unit has a first surface located adjacent to the document support surface and extending in a first direction parallel to the document support surface, and a second surface being continuous with the first surface and extending in a second direction substantially orthogonal to the document support surface. The pivot axis of the openable unit extends in parallel to a specified edge of the document support surface, and the pivot axis is located in the first direction between the second surface and the specified edge of the document support surface and below the first surface in the second direction.

In the image reading apparatus, the pivot axis is located below the first surface in the second direction, which can lead to size reduction of the image reading apparatus in the second direction. In addition, as the pivot axis is located between the second surface and the specified edge of the document support surface in the first direction, the need to increase size of the image reading apparatus in the first direction can be obviated.

Thus, the image reading apparatus of the disclosure can be reduced in size.

According to another aspect of the disclosure, an image reading apparatus includes a main unit having a document support surface configured to support a document on the document support surface, a reading unit accommodated in the main unit and configured to read an image of the document supported on the document support surface, and an openable unit coupled to the main unit and configured to pivot about a pivot axis between a closed position where the document support surface of the main unit is covered and a released position where the document support surface of the main unit is exposed. The pivot axis of the openable unit is located, in the main unit, below the document support surface and at a rear of the document support surface.

In the image reading apparatus, the pivot axis is located, in the main unit, below the document support surface and at the rear of the document support surface, which lead to size reduction of the image reading apparatus in a height direction and a width direction.

Thus, the image reading apparatus can be reduced in size.

BRIEF DESCRIPTION OF THE DRAWINGS

Reference is made to the following description taken in connection with the accompanying drawings, like reference numerals being used for like corresponding parts in the various drawings.

DETAILED DESCRIPTION

Illustrative embodiments of the disclosure will be described with reference to the following drawings.

A first illustrative embodiment will be described.

Figure 1:
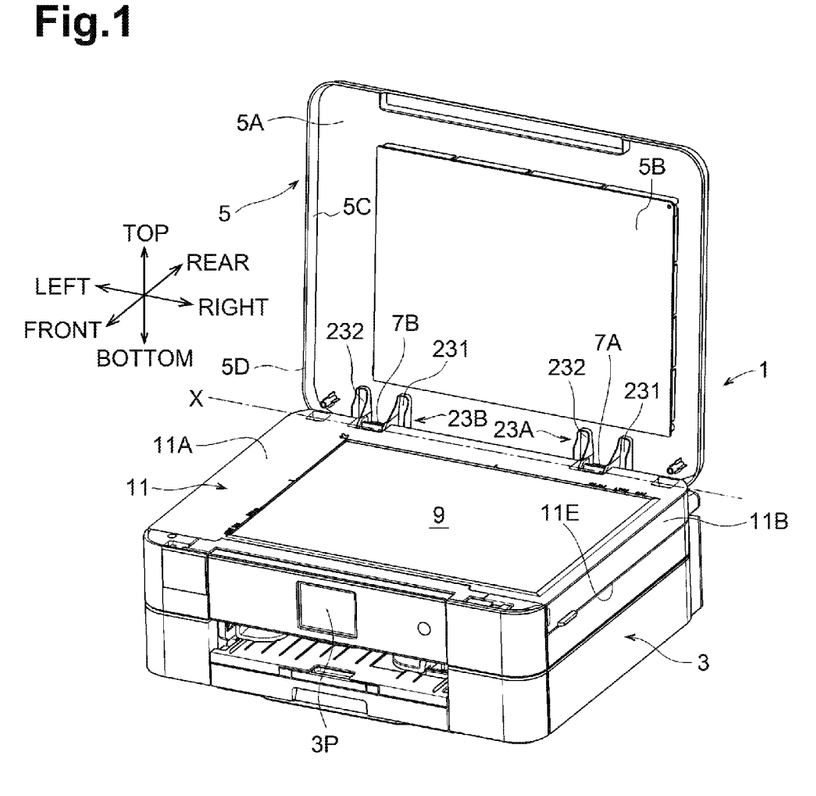
FIG. 1 is a perspective view of a multifunction apparatus according to a first illustrative embodiment, when viewed from a front side.

A multifunction apparatus 1 illustrated in FIG. 1 is an example of the image reading apparatus of the disclosure. In FIG. 1, directions of "front", "rear", "right", "left", "upper or top", and "lower or bottom" are indicated based on that a side of the multifunction apparatus 1 on which an operation panel 3P is disposed is defined as the front side of the multifunction apparatus 1, and a left side of the multifunction apparatus 1 when viewed in front of the operation panel 8P is defined as a left side of the multifunction apparatus. The directions in drawings on FIG. 2 or later are indicated based on those in FIG. 1. The following will describe elements included in the multifunction apparatus 1 with reference to FIG. 1.

General structure of the multifunction apparatus 1 will be described.

Figure 2:
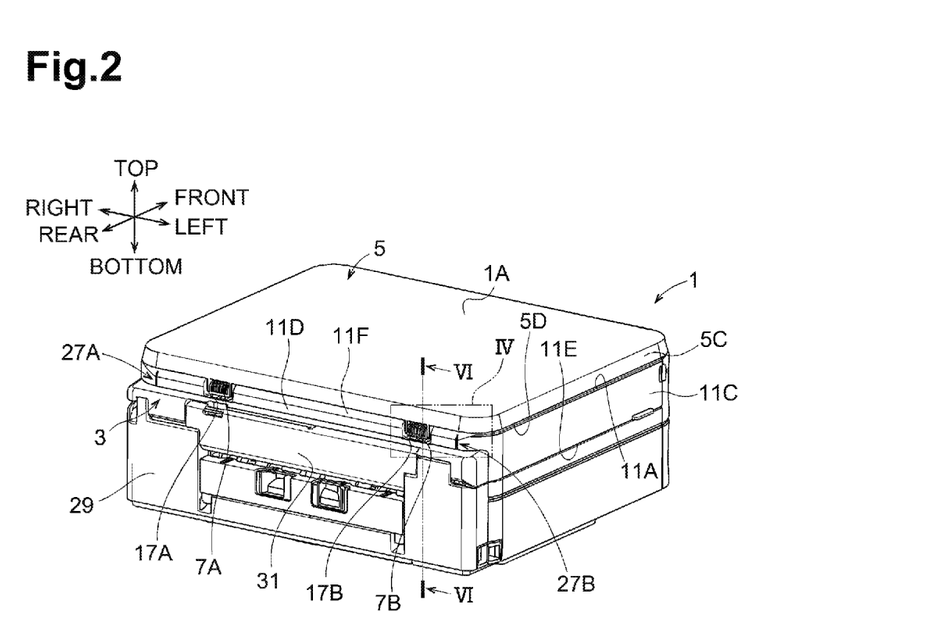
FIG. 2 is a perspective view of the multifunction apparatus when viewed from a rear side.
Figure 3:
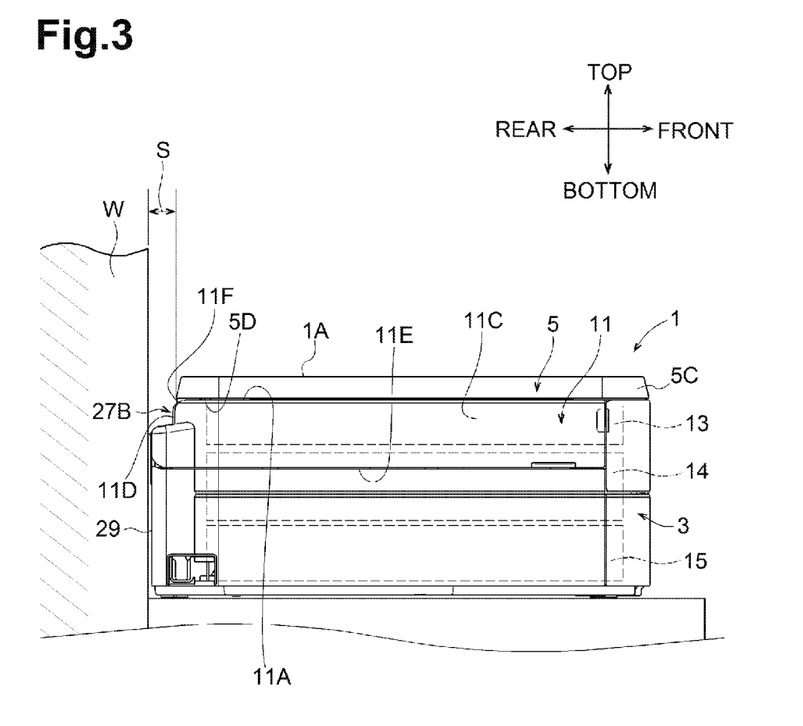
FIG. 3 is an enlarged side view of the multifunction apparatus.

As illustrated in FIGS. 1 and 2, the multifunction apparatus 1 includes a main unit 3, an openable unit 5, and a pair of hinges 7A, 7B. The main unit 3 has a box shape with substantially flat surfaces and a front side of the main unit 3 contains a touch panel, e.g., an operation panel 3P. The main unit 3 has a document support surface 9 and includes a frame member 11. As illustrated in FIG. 3, the main unit 3 accommodates a reading unit 13, an image forming unit 14, and a feeding unit 15.

Figure 6:
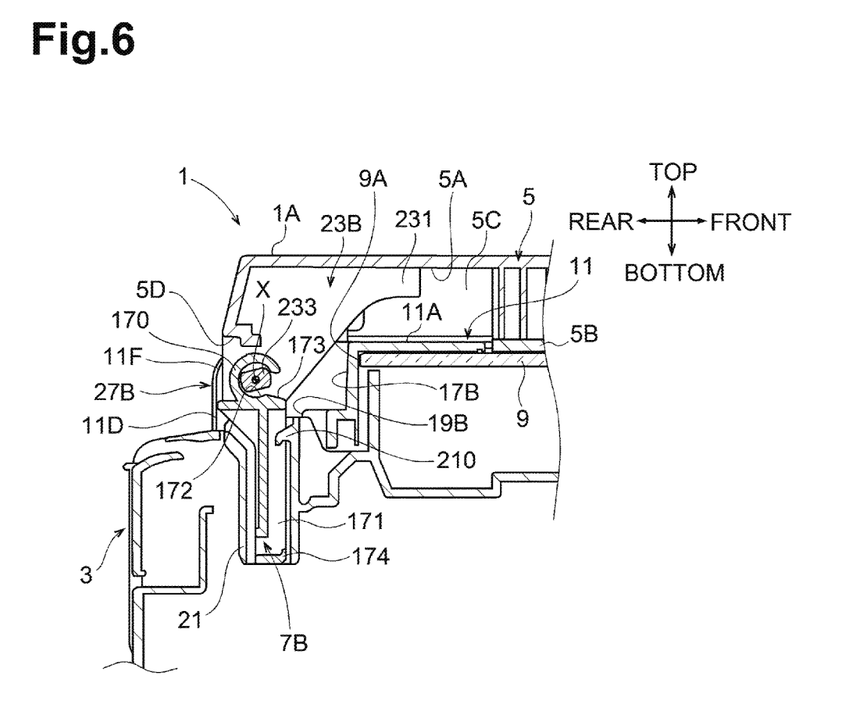
FIG. 6 is an enlarged cross sectional view taken along a line VI-VI in FIG. 2, partially illustrating a hinge and adjacent parts in a first state when the openable unit is in the closed position.

As illustrated in FIG. 1, the document support surface 9 and the frame member 11 are disposed in an upper portion of the main unit 3. The document support surface 9 is formed by a platen glass. More specifically, the document support surface 9 is formed by an upper surface of the platen glass. As illustrated in FIG. 6, the document support surface 9 has a rear edge 9A extending in a left-right direction of the main unit 3. The rear edge 9A is an example of a specified edge of the disclosure. As illustrated in FIG. 1, the document support surface 9 is shaped like a rectangle and has a front edge extending in the left-right direction of the main unit 3 and in parallel with the rear edge 9A, and a left edge and a right edge extending in a front-rear direction of the main unit 3, orthogonally to the rear edge 9A and the front edge. The document support surface 9 is configured to support a document from below when an image of the document is read. Documents to be read include a sheet of paper, a transparency, and a paper book.

Figure 4:
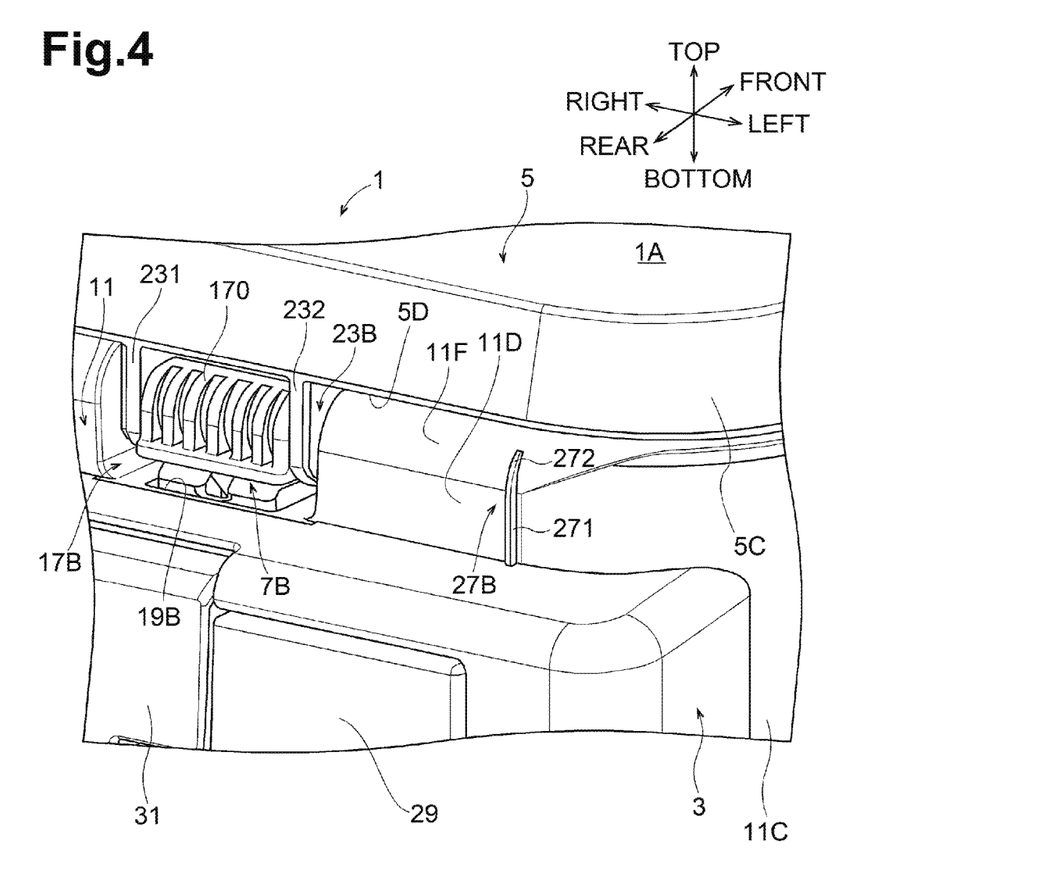
FIG. 4 is an enlarged perspective view of a portion enclosed in a rectangle of the multifunction apparatus illustrated in FIG. 4.

As illustrated in FIG. 1, the frame member 11 is a resin-made frame member and holds the edges of the document support surface 9. As illustrated in FIGS. 1 and 2, the frame member 11 has an upper surface 11A, a right side surface 11B, a left side surface 11C, a rear surface 11D, and a bottom surface 11E. As illustrated in FIG. 4, the frame member 11 has a curved surface 11F. The upper surface 11A is an example of a first surface of the disclosure. The rear surface 11D is an example of a second surface of the disclosure.

As illustrated in FIG. 1, the upper surface 11A is located adjacent to the document support surface 9, and extends in in the front-rear direction parallel to the document support surface 9. The front-rear direction is an example of a first direction of the disclosure.

The rear surface 11D illustrated in FIG. 4 is continuous with the curved surface 11F, which is continuous with a rear end of the upper surface 11A, and extends downward in a height direction substantially perpendicular to the document support surface 9. The height direction is an example of a second direction of the disclosure.

The left side surface 11C is continuous with left edges of the upper surface 11A and the rear surface 11D, and extends downward in the height direction in like manner with the rear surface 11D. The right side surface 11B illustrated in FIG. 1 is continuous with right edges of the upper surface 11A and the rear surface 11D and extends downward in the height direction in like manner with the rear surface 11D.

The bottom surface 11E illustrated in FIG. 3 is continuous with the right side surface 11B, the left side surface 11C, and the rear surface 11D. The bottom surface 11E faces the upper surface 11A and the document support surface 9 at a specified distance corresponding to a length of each of the right side surface 11B and the left side surface 11C in the height direction.

Figure 9:
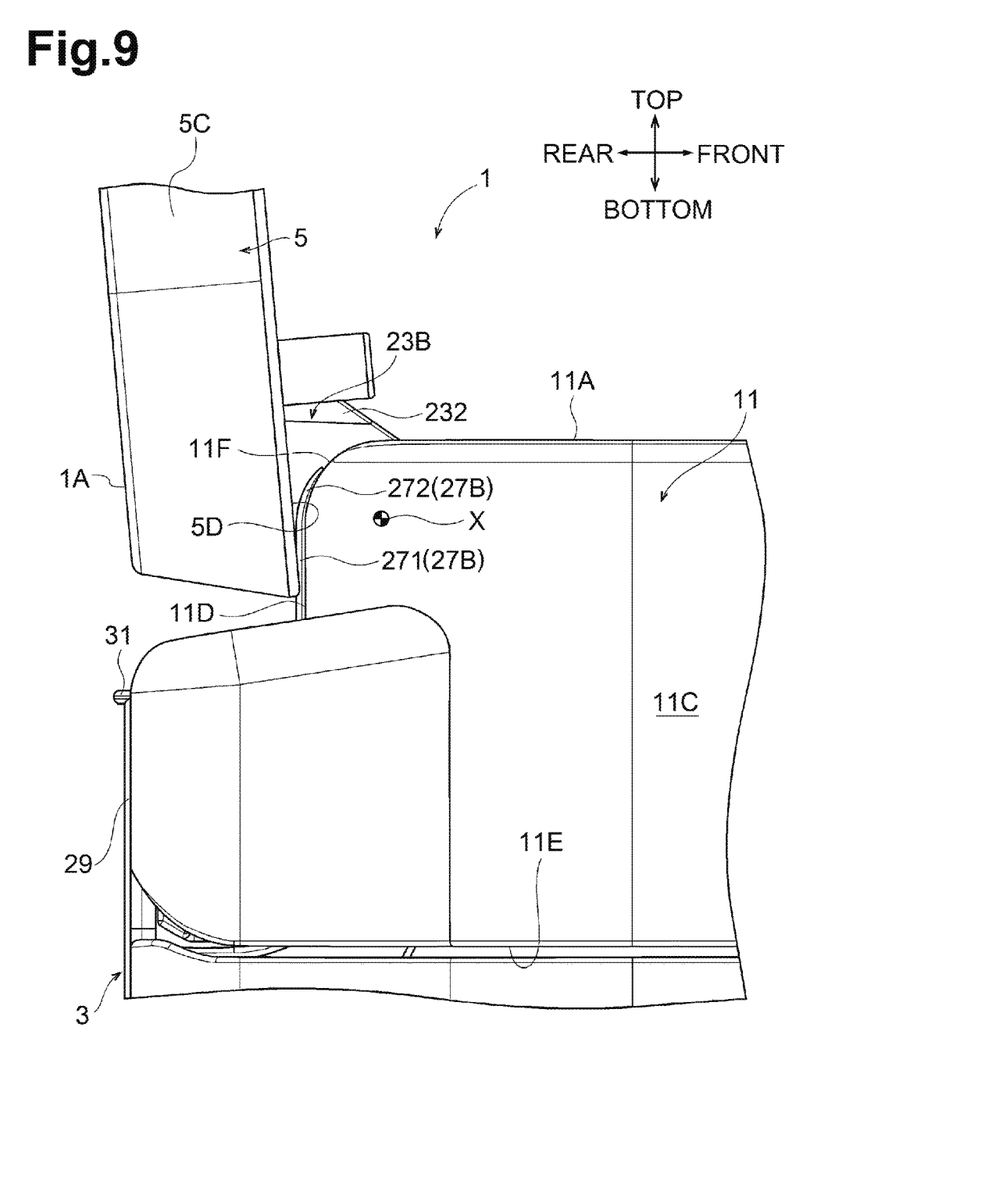
FIG. 9 is an enlarged side view of the multifunction apparatus, illustrating that a facing surface is in line contact with a contact rib.

As illustrated in FIG. 4, the curved surface 11F is located between the upper surface 11A and the rear surface 11D. As illustrated in FIG. 9, the curved surface 11F connects the upper surface 11A with the rear surface 11D by a curved surface. The upper surface 11A, the right side surface 11B, the left side surface 11C, the rear surface 11D, the bottom surface 11E, and the curved surface 11F form the frame member 11 shaped like a box of which upper portion is open, and the document support surface 9 is located in the open upper portion of the frame member 11.

As illustrated in FIG. 3, the reading unit 13 is disposed below the document support surface 9 in the main unit 3. The reading unit 13 has a read sensor and a scanning mechanism configured to move the read sensor to reciprocate in the left-right direction in the main unit 3. The reading unit 13 is configured to read a document supported on the document support surface 9. The read sensor is a known image-reading sensor such as a contact image sensor (CIS) and a charge-coupled device (CCD).

The image forming unit 14 is disposed below the reading unit 13 in the main unit 3. The image forming unit 14 is configured to form an image on a sheet by inkjet method or laser method. The feeding unit 15 includes a feed roller and an ejection roller, which are not illustrated, and is configured to feed a sheet toward the image forming unit 14 and eject the sheet having an image formed thereon out of the main unit 3.

As illustrated in FIG. 1, the openable unit 5 is coupled to the main unit 3 such that the openable unit 5 is configured to pivot about a pivot axis X. The pivot axis X extends in parallel with the rear edge 9A of the document support surface 9, that is, extends in the left-right direction of the main unit 3.

Figure 5:
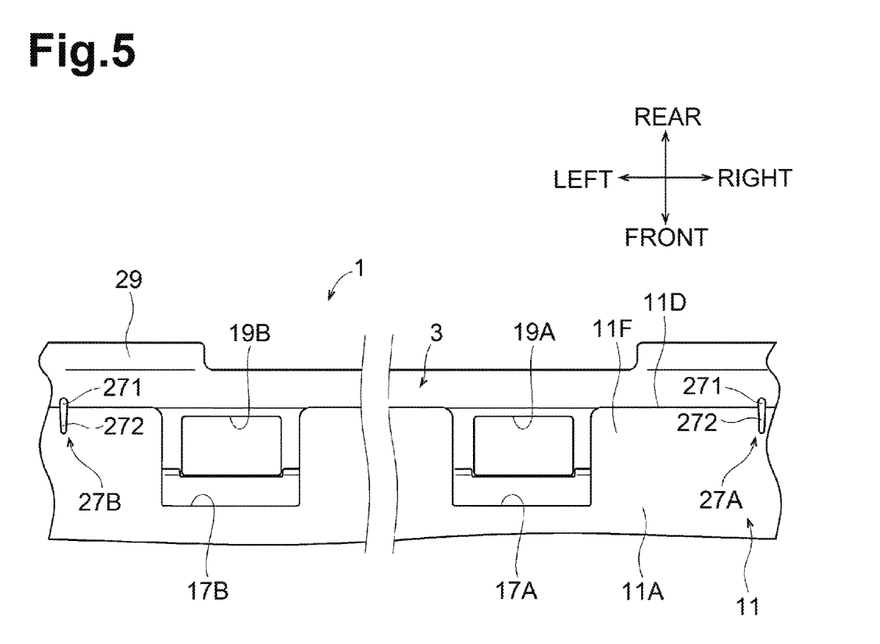
FIG. 5 is an enlarged top plan view schematically illustrating a rear portion of a main unit of the multifunction apparatus when an openable unit is removed.

As illustrated in FIG. 5, a rear end of the upper surface 11A of the frame member 11 contains two recessed portions 17A, 17B which are recessed downward. Each of the recessed portions 17A, 17B is a space defined by a right inner wall, a left inner wall, front inner wall, and a bottom surface. The front inner wall is continuous at its upper end with the upper surface 11A. The right and left inner walls are continuous at their rear ends with the rear surface 11D. The bottom surface of the recessed portion 17A has a insertion hole 19A communicating with inside of the main unit 3 and the bottom surface of the recessed portion 17B has a insertion hole 19B communicating with inside of the main unit 3. For the sake of brevity, FIG. 5 illustrates the frame member 11 schematically and omits illustration of a sheet supply tray 31.

As illustrated in FIG. 6, an accommodating portion 21 is provided below a the insertion hole 19B. Although illustration is omitted, there are two accommodating portions 21, which are recessed toward inside of the main unit 3 and communicate with the recessed portions 17A, 17B via the insertion holes 19A, 19B, respectively. An engaging portion 210 protrudes in each of the accommodating portion 21. The engaging portion 210 is shaped like a hook protruding rearward from an upper end portion of a front inner wall of the accommodating portion 21.

As illustrated in FIG. 2, the hinges 7A, 7B are disposed between the main unit 3 and the openable unit 5. More specifically, the hinge 7A is disposed within the recessed portion 17A and the hinge 7B is disposed within the recessed portion 17B. The hinges 7A, 7B are located within the recessed portions 17A, 17B, respectively, without protruding rearward from the recessed portions 17A, 17B. With this location, the hinges 7A, 7B are located further to the front, in the front-rear direction, than the rear surface 11D. As illustrated in a cross sectional view of FIG. 6, the hinges 7A, 7B (only 7B illustrated) have no portions protruding rearward further than the rear surface 11D when viewed in the left-right direction. The hinges 7A, 7B are identical in structure. The following description will be made based on the hinge 7B.

As illustrated in FIG. 6, the hinge 7B includes a shaft support portion 170 and a base portion 171. The shaft support portion 170 and the base portion 171 are of a single-piece construction. The shaft support portion 170 has a cylindrical inner surface 172 centered around the pivot axis X. The shaft support portion 170 also has a cutout 173 for exposing the inner surface 172. The cutout 173 is disposed in parallel with the pivot axis X. The base portion 171 extends downward from the shaft support portion 170 in a direction away from the shaft support portion 170. A lower end of the base portion 171 includes an engaged portion 174 engageable with the engaging portion 210 of the accommodating portion 21.

Figure 8:
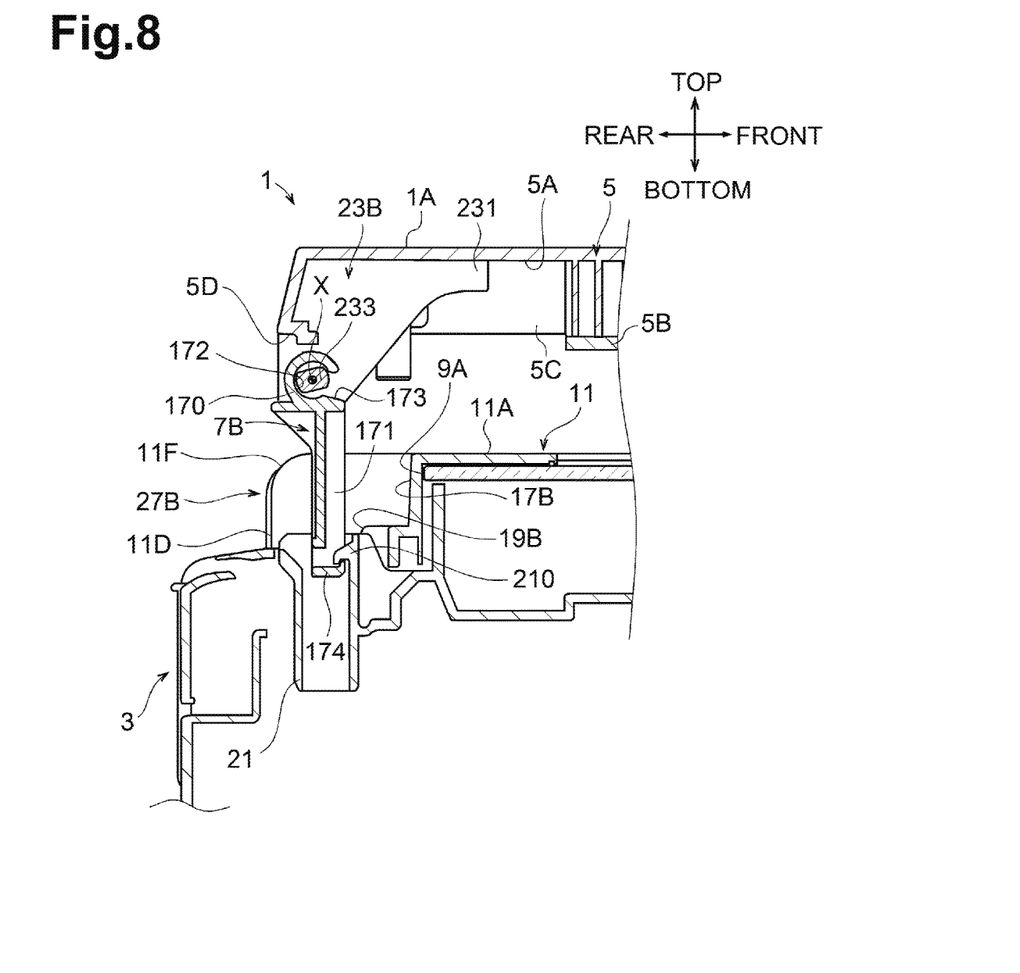
FIG. 8 is an enlarged cross sectional view taken along the line VI-VI in FIG. 2, partially illustrating the hinge and adjacent parts in a second state when the openable unit is in the closed position.

The hinge 7B is disposed within the recessed portion 17B with the base portion 171 being inserted from the insertion hole 19B toward inside of the accommodating portion 21. With this arrangement, the base portion 171 is movable up and down in the accommodating portion 21. As illustrated in FIG. 8, when the engaging portion 210 and the engaged portion 174 become engaged with each other in the accommodating portion 21, the base portion 171 having moved up is prevented from coming off from the accommodating portion 21. In this way, the hinge 7B is movable up and down relative to the main unit 3 in an area in which the hinge portion 171 is movable up and down in the accommodating portion 21. Much the same is true on the hinge 7A. The hinge 7A is movable up and down relative to the main unit 3 in an area in which the hinge portion 171 is movable up and down in the accommodating portion 21.

As illustrated in FIG. 1, the openable unit 5 has an underside 5A opposite to a surface forming an exterior surface 1A (FIG. 2) of the multifunction apparatus 1. The underside 5A has a pressing member 5B attached to the underside 5A. The pressing member 5B is configured to, when the openable unit 5 is in a closed position, press a document supported on the document support surface 9 from above. The pressing member 5B is constructed from elastic material with a surface facing the document support surface 9 being white. An outer wall 5C is provided along the edges of the underside 5A. The outer wall 5C protrudes from the edges of the underside 5A. An end of the outer wall 5C opposite to the underside 5A is provided with a facing surface 5D.

The rear end portion of the openable unit 5 has two connecting portions 23A, 23B. Each of the connecting portions 23A, 23B has a first wall portion 231, a second wall portion 232, and a shaft portion 233 illustrated in FIG. 6. As illustrated in FIG. 1, the first wall portion 231 and the second wall portion 232 protrude from the underside 5A toward the main unit 3. The shaft portion 233 is located between the first wall portion 231 and the second wall portion 232, centers on the pivot axis X, and extends horizontally in the left-right direction of the main unit 3. The shaft portion 233 is connected at one end to the first wall portion 231 and at the other end to the second wall portion 232.

As illustrated in FIG. 6, in the connecting portion 23B, the shaft portion 233 is supported by the shaft support portion 170 of the hinge 7B by inserting the shaft portion 233 into the shaft support portion 170 via the cutout 173. Similarly, in the connecting portion 23A, the shaft portion 233 is supported by the shaft support portion 170 of the hinge 7A. With this structure, the shaft support portion 170 of each of the hinges 7A, 7B constitutes the pivot axis X and the openable unit 5 is coupled to the main unit 3 via the hinges 7A, 7B such that the openable unit 5 is configured to pivot around the pivot axis X. The connecting portions 23A, 23B and the hinges 7A, 7B may be changed in number as is appropriate for design.

Figure 7:
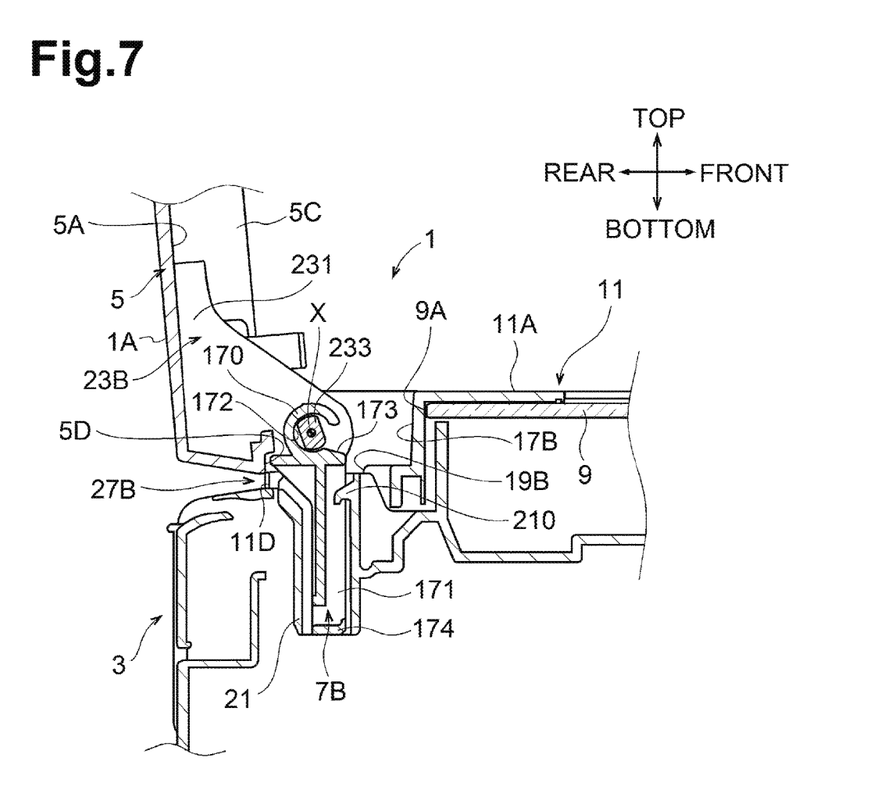
FIG. 7 is an enlarged cross sectional view taken along the line VI-VI in FIG. 2, partially illustrating the hinge and adjacent parts in the first state when the openable unit is in the released position.

The openable unit 5 is configured to move between a closed position (FIG. 6) and a released position (FIG. 7) by pivoting around the pivot axis X relative to the main unit 3. In the multifunction apparatus 1, the openable unit 5 covers the document support surface 9 when in the closed position, and exposes the document support surface 9 when in the released position. As illustrated in FIGS. 6 and 7, the openable unit 5 is configured to move between the closed position and the released position in a state where the hinges 7A, 7B are located in lower portions of the respective accommodating portions 21 of the main unit 3 (hereinafter referred to as a first state). As illustrated in FIG. 8, the openable unit 5 is further configured to move between the closed position and the released position in a state where the hinges 7A, 7B are located in upper portions of the respective accommodating portions 21 of the main unit 3 (hereinafter referred to as a second state). When the multifunction apparatus 1 is not in use, the hinges 7A, 7B are in the first state.

When the openable unit 5 is in the closed position, the facing surface 5D of the openable unit 5 faces the upper surface 11A of the frame member 11. Specifically, as illustrated in FIGS. 2 and 6, when the hinges 7A, 7B are in the first state and the openable unit 5 is in the closed position, the facing surface 5D adjacently faces the upper surface 11. As illustrated in FIG. 8, when the hinges 7A, 7B are in the first state and the openable unit 5 is in the closed position, the facing surface 5D faces the upper surface 11A at a distance.

When the hinges 7A, 7B are in the first state and the openable unit 5 moves from the closed position to the released position, a rear end portion of the facing surface 5D moves downward such as to overlap the curved surface 11F and the rear surface 11D of the frame member 11. As illustrated in FIG. 9, when the hinges 7A, 7B are in the first state and the openable unit 5 is in the released position, the rear end portion of the facing surface 5D faces the rear surface 11D of the frame member 11 and cover the rear surface 11D from rear.

As illustrated in FIGS. 6-8, the hinge 7B is disposed in the recessed portion 17B provided at the rear end of the upper surface 11A of the frame member 11 and the connecting portion 23B is located at the rear portion of the openable unit 5. As illustrated in FIG. 6, when the hinge 7B is in the first state, a part of each of the first wall portion 231 and the second wall portion 232, and the shaft portion 233 of the connecting portion 23B are located in the recessed portion 17B and the shaft portion 233 is supported by the shaft support portion 170 in the recessed portion 17B. As illustrated in FIG. 9, the pivot axis X is located in the height direction between the upper surface 11A and the bottom surface 11E of the frame member 11, in other words, the pivot axis X is located below the upper surface 11A. As illustrated in FIGS. 6-8, when the hinge 7B is in one of the first state and the second state, the pivot axis X is located in the front-rear direction between the rear surface 11D of the frame member 11 and the rear edge 9A of the document support surface 9 or between imaginary lines extending vertically from the rear surface 11D of the frame member 11 and the rear edge 9A of the document support surface 9, respectively.

As the pivot axis X is located in the position described above, the multifunction apparatus 1 allows the openable unit 5 to move between the closed position and the released position in a relatively small range of motion. This reduces an area occupied by the multifunction apparatus 1 when used.

As illustrated in FIG. 5, a contact rib 27A is provided at the right end portions of the rear surface 11D and the curved surface 11F, which are located at the rear side of the frame member 11, and a contact rib 27B is provided at the left end portions of the rear surface 11D and the curved surface 11F, which are located at the rear side of the frame member 11. The contact ribs 27A, 27B are an example of a protrusion of the disclosure. The contact ribs 27A, 27B are also an example of a slide contact portion of the disclosure. As the contact ribs 27A, 27B are identical in structure, the following description will be made based on the contact rib 27B. As illustrated in FIG. 9, when the openable unit 5 is in the released position, the contact rib 27B protrudes from the rear surface 11D and the curved surface 11F toward the facing surface 5D of the openable unit 56.

As illustrated in FIG. 4, the contact rib 27B is made up of a first rib portion 271 and a second rib portion 272. The first rib portion 271 is integrally formed on the rear surface 11D and extends in the height direction. The second rib portion 272 is integrally formed on the curved surface 11F and extends in the height direction continuously with the first rib portion 271. The second rib portion 272 is curved along the curved surface 11F. As illustrated in FIG. 5, the first rib portion 271 and the second rib portion 272 have a chamfered outer surface, which is curved. When the openable unit 5 moves between the closed position and the released position, the rear end portion of the facing surface 5D comes in contact with the contact ribs 27A, 27B. As illustrated in FIG. 9, when the openable unit 5 is in the released position, the rear end portion of the facing surface 5D is in contact with the contact rib 27B. Similarly, the rear end portion of the facing surface 5D is in contact with the contact rib 27A. In the multifunction apparatus 1, there is a possibility that the facing surface 5D may contact the contact ribs 27A, 27B before the openable unit 5 reaches the released position. The first rib portion 271 and the second rib portion 272 may be changed in shape as is appropriate for design. The contact rib 27A may be provided singly at a center of the rear surface 11D and the curved surface 11F in the left-right direction. Alternatively, more than three contact ribs may be provided.

In the multifunction apparatus 1, as the pivot axis X is located in the position illustrated in FIG. 9, the range of motion for the openable unit 5 becomes relatively small, but the range of motion for the openable unit 5 approaches the main unit 3. Thus, when the hinges 7A, 7B are in the first state and the openable unit 5 moves between the closed position and the released position, noise may be caused by contact between the rear end portion of the facing surface 5D and the main unit 3. However, the contact ribs 27A, 27B are provided, reducing a chance of direct contact between the rear end portion of the facing surface 5D and the main unit 3 in a process where the openable unit 5 pivots between the closed position and the released position, reducing a chance of noise occurrence.

As illustrated in FIG. 2, a rear side of the main unit 3 includes a protruding surface 29. The protruding surface 29 is an example of a third surface of the disclosure. The protruding surface 29 is located below the rear surface 11D and extends downward in the height direction toward a lower end of the main unit 3. The protruding surface 29 protrudes outward further than the rear surface 11D in the front-rear direction. As illustrated in FIG. 3, for example, when the multifunction apparatus 1 is placed as close as possible to a wall surface W of a room, the protruding surface 29 provides for a space S required to pivot the openable unit 5 to the released position between the main unit 3 and the wall surface W.

There are two protruding surfaces 29 disposed at left and right ends of the rear side of the main unit 3. A sheet supply tray 31 is disposed between the protruding surfaces 29. The sheet supply tray 31 is movably attached to the main unit 3 and configured to hold a stack of sheets, which are to be fed to the image forming unit 14 by the feeding unit 15 located in the main unit 3.

When a document is copied in the multifunction apparatus 1, a sheet to be printed is placed on the sheet supply tray 31. If a document to be copied is thin, the openable unit 5 is pivoted about the pivot axis X from the closed position into the released position, and the document is placed on the document support surface 9 of the main unit 3. Then, the openable unit 5 is pivoted about the pivot axis X back into the closed position with the hinges 7A, 7B being left in the first state, and the reading unit 13 reads an image of the document by operation of the operational panel 3P. In the main unit 3, the feeding unit 15 feeds a sheet in the sheet supply tray 31 to the image forming unit 14 and the image read by the reading unit 13 is printed on the sheet by the image forming unit 14. The sheet having the image printed on the sheet is ejected from inside the main unit 3 by the feeding unit 15. In this manner, a copy of the document is completed.

If a document is thick like a book, the openable unit 5 is pivoted into the released position, the document is placed on the document support surface 9, the hinges 7A, 7B are set in the second state, and then the openable unit 5 is pivoted back into the closed position. Then, as in the case of copying a thin document described above, the reading unit 14 reads an image of the thick document and the image forming unit 14 prints the image on a sheet.

In the multifunction apparatus 1, the recessed portions 17A, 17B are provided at the rear end of the upper surface 11A of the frame member 11, and the connecting portions 23A, 23B are located at the rear end portion of the openable unit 5. With this structure, when the hinges 7A, 7B are in the first state, a part of the first wall 231, a part of the second wall 232, and the shaft portion 233 of each of the connecting portions 23A, 23B are disposed within a corresponding one of the recessed portions 17A, 17B. When the hinges 7A, 7B are in the first state, the pivot axis X is located in the height direction between the upper surface 11A and the bottom surface 11E of the frame member 11. In other words, in the multifunction apparatus 1, the pivot axis X is located below the upper surface 11A of the frame member 11 and the facing surface 5D of the openable unit 5, and thus, the need to reduce the size of the multifunction apparatus 1 in the height direction can be achieved.

The pivot axis X is located in the front-rear direction between the rear surface 11D of the frame member 11 and the rear edge 9A of the document support surface 9. Thus, as compared with a case where the pivot axis X is located rearward further than the rear surface 11D, the need to increase the size of the multifunction apparatus 1 in the height direction can be also obviated.

The hinges 7A, 7B are accommodated in the recessed portions 17A, 17B, respectively, without making the respective shaft support portions 170 protrude rearward from the corresponding recessed portions 17A, 17B. In other words, the hinges 7A, 7B are located further to the front, in the front-rear direction, than the rear surface 11D of the frame member 11. Even in this respect, the need to increase the size of the multifunction apparatus 1 in the front-rear direction can be obviated.

In the multifunction apparatus 1, the pivot axis X is defined by the shaft support portions 170 of the hinges 7A, 7B, and the base portions 171 of the hinges 7A, 7B are movable up and down in the height direction through the respective insertion holes 19A, 19B in the respective accommodating portions 21. By selecting the state of the hinges 7A, 7B from the first state and the second state, the multifunction apparatus 1 can read an image of a document even when the document is thin or thick. Thus, the multifunction apparatus 1 can read various kinds of documents without having to increase the size of the openable unit 5.

Thus, the need to reduce the size of the multifunction apparatus 1 in both of the height direction and the front-rear direction can be achieved.

As illustrated in FIG. 9, when the openable unit 5 pivots between the released position and the closed position, the rear end portion of the facing surface 5D makes line contact with the contact rib 27A, 27B. Thus, in the multifunction apparatus 1, an area of contact between the facing surface 5D and each of the contact ribs 27A, 27B is small and the rear end portion of the facing surface 5D does not directly make surface contact with the rear surface 11D and the curved surface 11F. Thus, the multifunction apparatus 1 can reduce a chance of noise occurrence in a process where the openable unit 5 pivots between the closed position and the released position.

The insertion holes 19A, 19B, the accommodating portions 21, and the base portions 171 of the hinges 7A, 7B are designed to each have an inevitable space with a corresponding one of the hinges 7A, 7B in order to enable the hinges 7A, 7B to move up and down in a corresponding one of the accommodating portions 21. When the openable unit 5 is pivoted to the closed position or the released position or when the openable unit 5 held in the released position is moved up or down, the hinges 7A, 7B are likely to swing. As a result, the rear end portion of the facing surface 5D may slide on and make surface contact with the rear surface 11D and the curved surface 11F, and noise may easily occur.

In the multifunction apparatus 1, however, the contact ribs 27A, 27B are provided at the left and right ends of the rear surface 11D. Each of the contact ribs 27A, 27B is made up of the first rib portion 271 formed on the rear surface 11D, and the second rib portion 272 formed on the curved surface 11F, and the first rib portion 271 and the second rib portion 272 are continuous with each other. Even when the hinges 7A, 7B are moved up or down relative to the respective accommodating portions 21 of the main unit 3 as described above, the contact ribs 27A, 27B can reduce occurrence of noise.

Each contact rib 27A, 27B, which is made up of the first rib portion 271 and the second rib portion 272, is integral with the rear surface 11D and the curved surface 11F. Since the contact ribs 27A, 27B are formed in one piece with the rear surface 11D and the curved surface 11F, there results a reduction in the number of parts required for the multifunction apparatus 1.

In the multifunction apparatus 1, the curved surface 11F connects the upper surface 11A with the rear surface 11D. This provides for a desired space between the rear end of the openable unit 5 and the rear end of the frame member 11, facilitating pivoting the openable unit 5 between the closed position and the released position.

When the multifunction apparatus 1 is placed as close as possible to the wall surface W of a room, the protruding surfaces 29 provide for the space S, which is required to pivot the openable unit 5 between the closed position and the released position, between the main body 3 and the wall surface W. Thus, there is no need to move or relocate the multifunction apparatus 1 away from the wall surface W every time the openable unit 5 is pivoted to the released position.

The protruding surfaces 29 are disposed at the left and right ends of the rear side of the main unit 3 and the sheet supply tray 31 is disposed between the protruding surfaces 29. The sheet supply tray 31 is detachably attached to the main unit 3 through the use of a limited area created between the protruding surfaces 29.

A second illustrative embodiment of the disclosure will be described with reference to FIG. 10.

Figure 10:
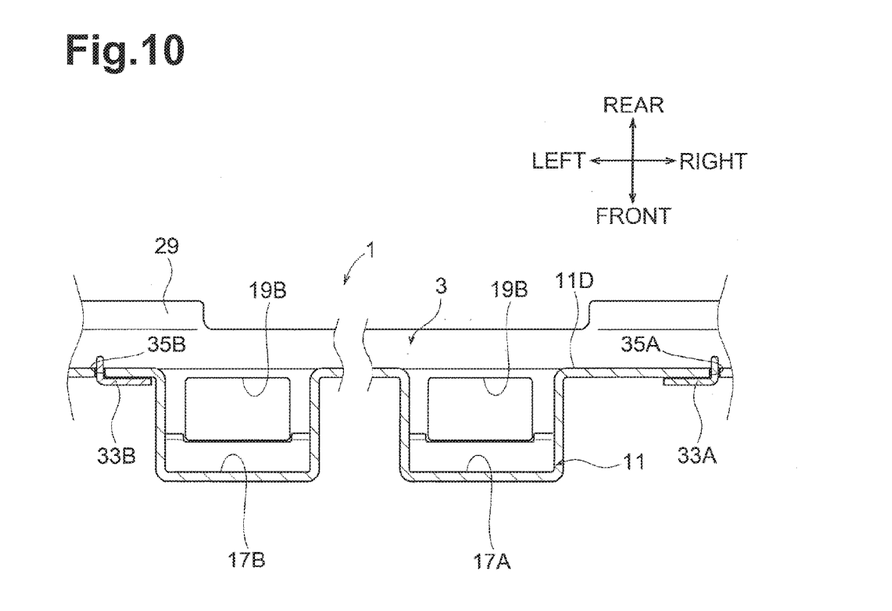
FIG. 10 is an enlarged top sectional view in horizontal plane of a main unit of a multifunction apparatus according to a second illustrative embodiment, schematically illustrating a rear portion of the main unit.

As illustrated in FIG. 10, in the multifunction apparatus 1 of the second illustrative embodiment, contact pieces 33A, 33B are provided instead of the contact ribs 27A, 27B of the first illustrative embodiment. The contact pieces 33A, 33B are an example of a protrusion of the disclosure. The contact pieces 33A, 33B are also an example of a slide contact portion of the disclosure. In the multifunction apparatus 1 of the second illustrative embodiment, the rear surface 11D has cutouts 35A, 35B at left and right ends of the rear surface 11D.

The contact pieces 33A, 33B are substantially L-shaped and symmetrically disposed. The contact piece 33A is attached to the right end portion of the rear surface 11D by being fitted in the cutout 35A. Similarly, the contact piece 33B is attached to the left end portion of the rear surface 11D by being fitted in the cutout 35B. Rear ends of the contact pieces 33A, 33B protrude from the rear surface 11D toward the facing surface 5D when the openable unit 5 is in the released position. The contact pieces 33A, 33B may be changed in shape as is appropriate for design. The contact piece 33A may be provided singly at a center of the rear surface 11D in the left-right direction. Alternatively, more than three contact pieces may be provided. It is noted that other elements of the multifunction apparatus 1 illustrated in FIG. 10 similar to or identical with those shown in and described in the first illustrative embodiment are designated by similar numerals, and thus the description thereof can be omitted for the sake of brevity.

In the multifunction apparatus 1 of the second illustrative embodiment, when the openable unit 5 pivots between the closed position and the released position, the rear end portion of the facing surface 5D makes line contact with each of the contact pieces 33A, 33B. With the contact pieces 33A, 33B, the rear end portion of the facing surface 5D does not directly make surface contact with the rear surface 11D and the curved surface 11F. Thus, the multifunction apparatus 1 can reduce a chance of noise occurrence in a process where the openable unit 5 pivots between the closed position and the released position.

In the multifunction apparatus 1 of the second illustrative embodiment, the contact pieces 33A, 33B are provided independently of the rear surface 11D and the frame member 11. Thus, even though the rear surface 11D is not formed with protrusions like the contact ribs 27A, 27B of the first illustrative embodiment, the protrusions can be created on the rear surface 11D by the contact pieces 33A, 33B. It is noted that other effects of the multifunction apparatus 1 of the second illustrative embodiment are similar to the multifunction apparatus 1 of the first illustrative embodiment.

While the disclosure has been described in detail with reference to the first and second illustrative embodiments, such embodiments are only examples and the disclosure is not limited to the specific details of these examples. Examples of the modification and alterations of the above-described embodiments are described below.

In the multifunction apparatus 1 of the first illustrative embodiment, for example, a protrusion may be provided on the rear end portion of the facing surface 5D by providing a member similar to the contact ribs 27A, 27B to the rear end portion of the facing surface 5D. Similarly, in the multifunction apparatus 1 of the second illustrative embodiment, a protrusion may be provided on the rear end portion of the facing surface 5D by providing a member similar to the contact pieces 33A, 33B to the rear end portion of the facing surface 5D. In these cases, the protrusion provided on the rear end portion of the facing surface 5D may protrude toward the rear surface 11D and the curved surface 11F when the openable unit 5 is in the released position. The contact ribs 27A, 27B may be formed on the rear surface 11D and the curved surface 11F of the frame member 11 and protrusions may be provided on the rear end portion of the facing surface 5D. In this case, when the openable unit 5 is in the released position, the contact ribs 27A, 27B may protrude toward the protrusions and the protrusions may protrude toward the contact ribs 27A, 27B. Similarly, in the multifunction apparatus 1 of the second illustrative embodiment, the contact pieces 33A, 33B may be attached to the rear surface 11D and protrusions protruding toward the contact pieces 33A, 33B may be provided on the rear end portion of the facing surface 5D.

As to the contact ribs 27A, 27B, the first rib portion 271 and the second rib portion 272 may be provided non-continuously. Alternatively, the contact ribs 27A and 27B may be made up of only one of the first rib portion 271 and the second rib portion 272.

Instead of the contact ribs 27A, 27B and the contact pieces 33A, 33B, a semi-spherical protrusion may be formed on at least one of the rear surface 11D and the curved surface 11F. The semi-spherical protrusion may be an example of a protrusion or a slide contact portion of the disclosure. In this case, when the openable unit 5 pivots between the closed position and the released position, the rear end portion of the facing surface 5D may make point contact with the semi-spherical protrusion. The first rib portion 271, the second rib portion 272, and the semi-spherical protrusion may be combined as an example of a protrusion or a slide contact portion of the disclosure. It is clear that effects similar to those brought about by the multifunction apparatus 1 described in the first and second embodiments can be appreciated.

The shaft support portions 170 of the hinges 7A, 7B may be disposed partially protruding rearward further than the rear surface 11D so that, when the openable unit 5 pivots between the released position and the closed position, the rear end portion of the facing surface 5D can contact a part of each of the shaft support portions 170. This structure may reduce a chance that, when the openable unit pivots between the released position and the closed position, the rear end portion of the facing surface 5D directly make surface contact with the rear surface 5D and the curved surface 11D.

The openable unit 5 may be provided with an automatic document feeder, ADF, configured to read an image of a document while feeding the document. The main unit 3 may be devoid of the image forming apparatus 14 and the feeding unit 15. The main unit 3 may be constituted as a single image reading apparatus.

The disclosure may be applied to an image reading apparatus, a multifunction apparatus, and other apparatus.

While the features herein have been described in connection with various example structures and illustrative aspects, it will be understood by those skilled in the art that other variations and modifications of the structures and aspects described above may be made without departing from the scope of the inventions described herein. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. An image reading apparatus comprising:
   a main unit having a document support surface configured to support a document on the document support surface, the main unit including a frame member holding edges of the document support surface, the frame member having:
   a first surface being adjacent to the document support surface and extending in a first direction parallel to the document support surface;

a second surface extending in a second direction substantially orthogonal to the document support surface; and a third surface being continuous with the second surface and facing the first surface at a specified distance from the first surface in the second direction;

a reading unit accommodated in the main unit and configured to read an image of the document supported on the document support surface; and an openable unit coupled to the main unit and configured to pivot about a pivot axis between a closed position where the document support surface of the main unit is covered and a released position where the document support surface of the main unit is exposed, the openable unit having a facing surface that, when the openable unit is in the closed position, faces the first surface of the frame member of the main unit, wherein one of the second surface of the frame member of the main unit and the facing surface of the openable unit includes a protrusion that, when the openable unit is in the closed position, protrudes toward the other of the second surface of the frame member of the main unit and the facing surface of the openable unit, and wherein the pivot axis of the openable unit extends in parallel to an edge of the document support surface, and the pivot axis is located between the second surface and the edge of the document support surface in the first direction and between the first surface and the third surface in the second direction.

2. The image reading apparatus according to claim 1, wherein the second surface of the frame member of the main unit includes the protrusion that, when the openable unit is in the closed position, protrudes toward the facing surface of the openable unit.

3. The image reading apparatus according to claim 2, wherein the protrusion includes a first rib portion formed on the second surface of the frame member of the main unit and extending in the second direction.

4. The image reading apparatus according to claim 3, wherein the frame member of the main unit has a curved surface connecting the first surface and the second surface, and wherein the protrusion includes a second rib portion formed on the curved surface of the frame member.

5. The image reading apparatus according to claim 4, wherein the second rib portion is continuous with the first rib portion.

6. The image reading apparatus according to claim 2, wherein the protrusion is integrally formed with the second surface of the frame member of the main unit.

7. The image reading apparatus according to claim 1, wherein the frame member of the main unit has a fourth surface extending in the second direction and protruding toward an exterior of the image reading apparatus further than the second surface in the first direction.

8. The image reading apparatus according to claim 7, further comprising a sheet supply tray disposed adjacent to the fourth surface and configured to hold a stack of sheets.

9. An image reading apparatus comprising:

a main unit comprising a document support surface configured to support a document on the document support surface, the main unit further comprising an upper surface including the document support surface, and a rear surface located at a rear of the document support surface and extending vertically below the upper surface;

a reading unit accommodated in the main unit and configured to read an image of the document supported on the document support surface; and an openable unit coupled to the main unit and configured to pivot about a pivot axis between a closed position where the document support surface of the main unit is covered and a released position where the document support surface of the main unit is exposed, the openable unit having a facing surface that faces the upper surface of the main unit when the openable unit is located in the closed position, the facing surface having a rear end portion located close to the pivot axis, wherein one of the rear surface of the main unit and the facing surface of the openable unit includes a slide contact portion that, when the openable unit is in the released position, contacts the other of the rear surface of the main unit and the facing surface of the openable unit, and wherein the pivot axis of the openable unit is located, in the main unit, below the document support surface and at the rear of the document support surface.

10. The image reading apparatus according to claim 9, wherein the pivot axis of the openable unit is located between the rear surface of the main unit and a rear end of the document support surface.

11. The image reading apparatus according to claim 9, wherein the slide contact portion includes a rib protruding toward the facing surface of the openable unit.

12. The image reading apparatus according to claim 9, wherein the rear surface of the main unit includes a curved surface portion continuous with a rear end of the upper surface, and the slide contact portion extends along the curved surface portion.

13. The image reading apparatus according to claim 9, wherein the slide contact portion is integral with the rear surface of the main unit.

14. The image reading apparatus according to claim 9, wherein the slide contact portion protrudes from the rear surface of the main unit.

15. The image reading apparatus according to claim 9, wherein the openable unit is further configured to move vertically relative to the main unit such that the pivot axis of the openable unit is located above the document support surface.

* * * * *